Nov. 8, 1932.  C. T. HOFFMAN  1,886,953
MEANS FOR AUTOMATICALLY DEFROSTING REFRIGERATING UNITS
Filed Sept. 21, 1929  7 Sheets-Sheet 1

Inventor
Charles T. Hoffman

Nov. 8, 1932. C. T. HOFFMAN 1,886,953
MEANS FOR AUTOMATICALLY DEFROSTING REFRIGERATING UNITS
Filed Sept. 21, 1929 7 Sheets-Sheet 2

COOLING CHAMBER

Inventor
Charles T. Hoffman

Nov. 8, 1932.  C. T. HOFFMAN  1,886,953
MEANS FOR AUTOMATICALLY DEFROSTING REFRIGERATING UNITS
Filed Sept. 21, 1929  7 Sheets-Sheet 3
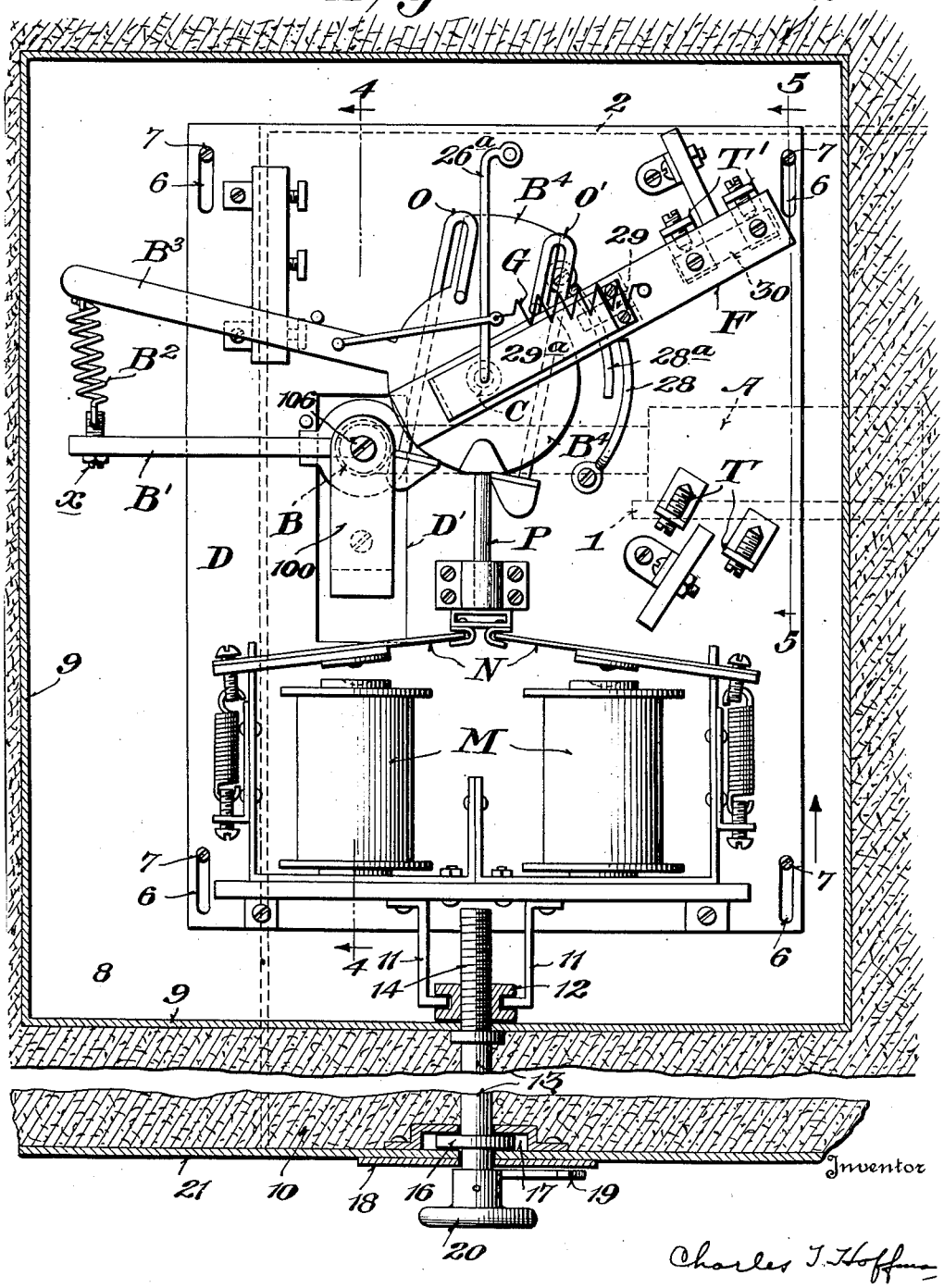
Inventor
Charles T. Hoffman

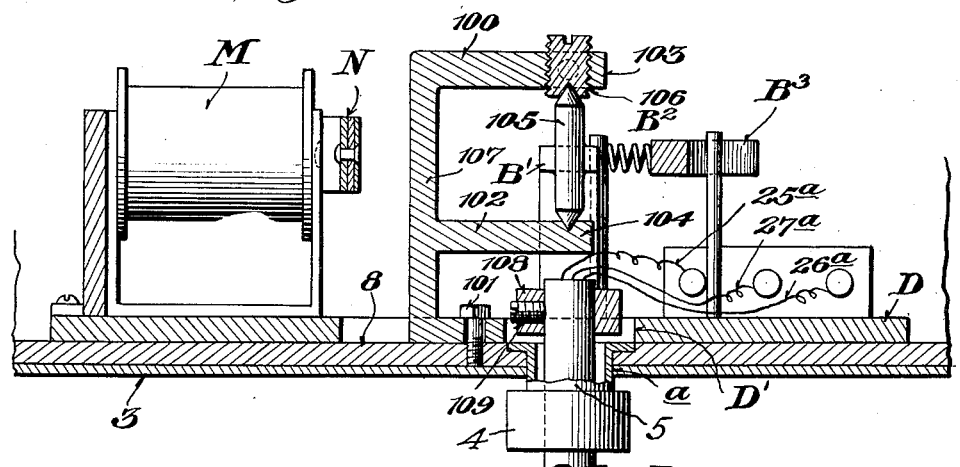
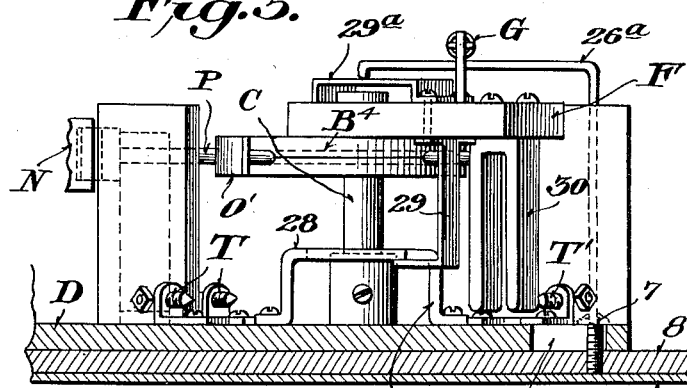
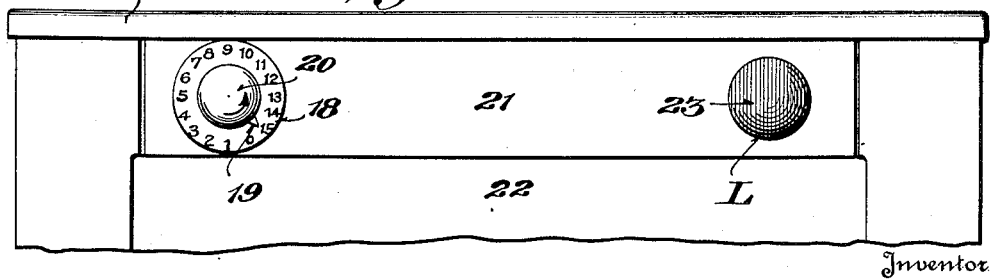

Nov. 8, 1932.    C. T. HOFFMAN    1,886,953
MEANS FOR AUTOMATICALLY DEFROSTING REFRIGERATING UNITS
Filed Sept. 21, 1929    7 Sheets-Sheet 5
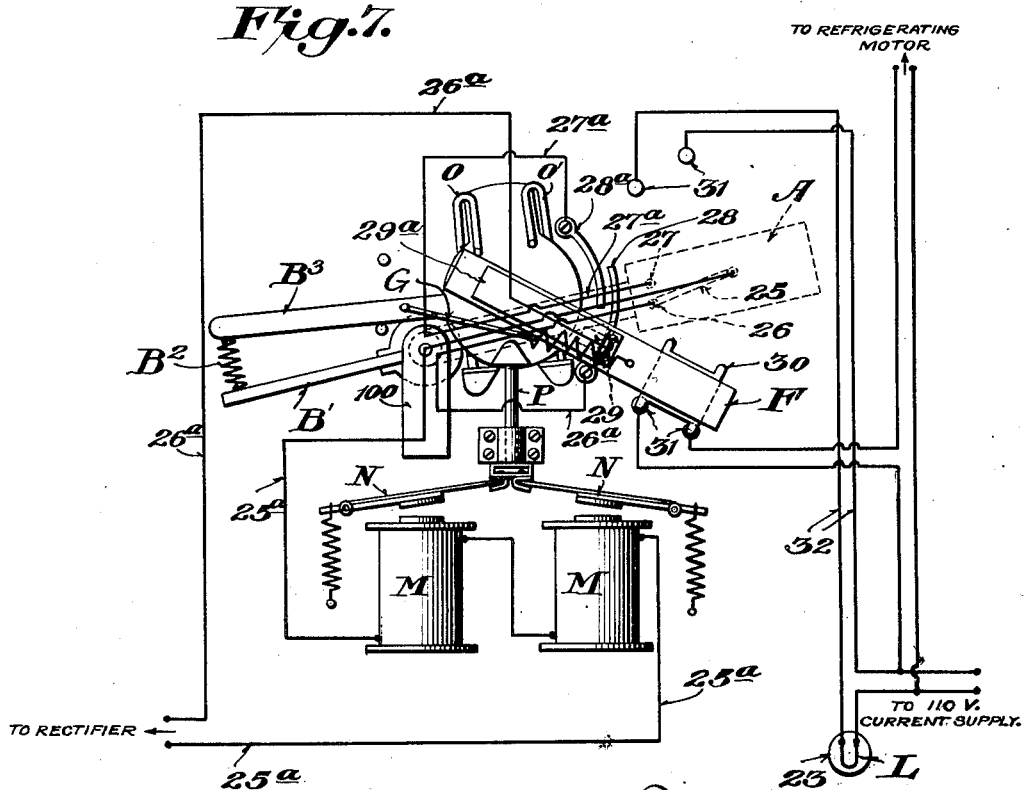
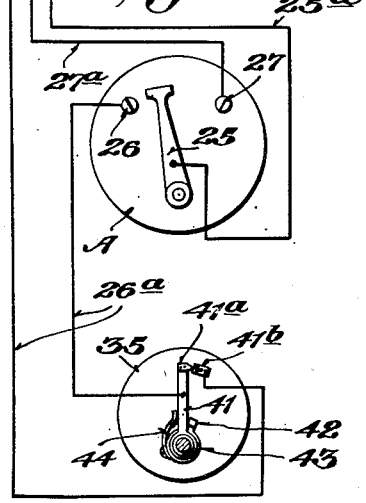
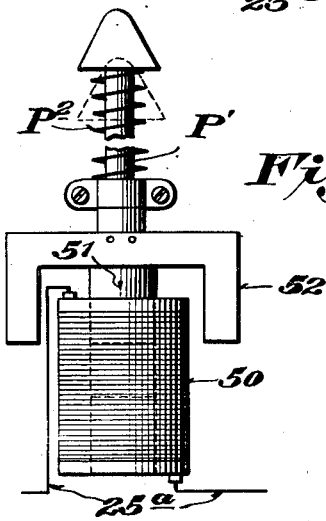
Inventor
Charles T. Hoffman

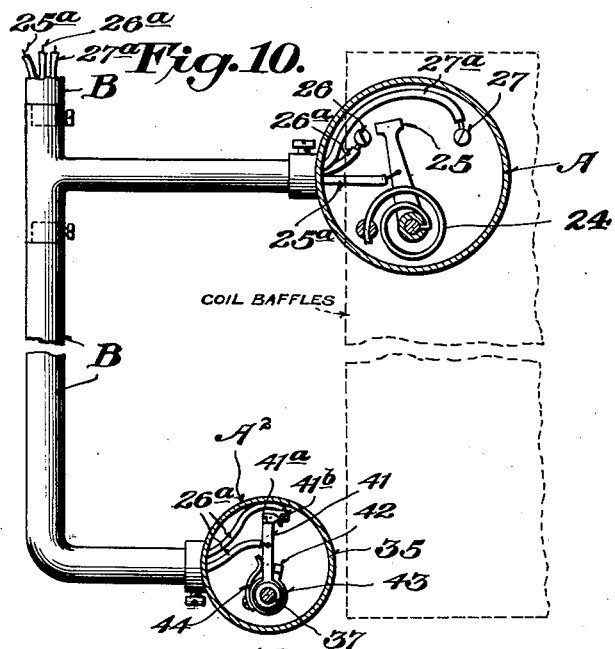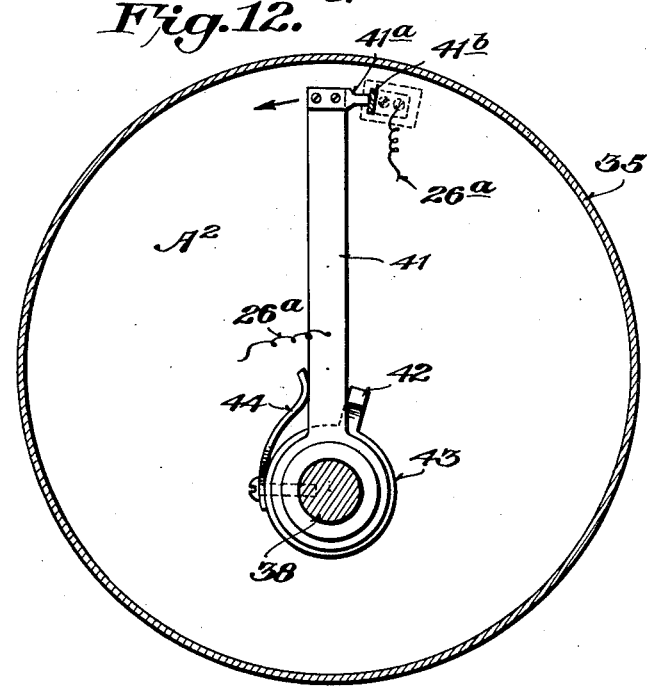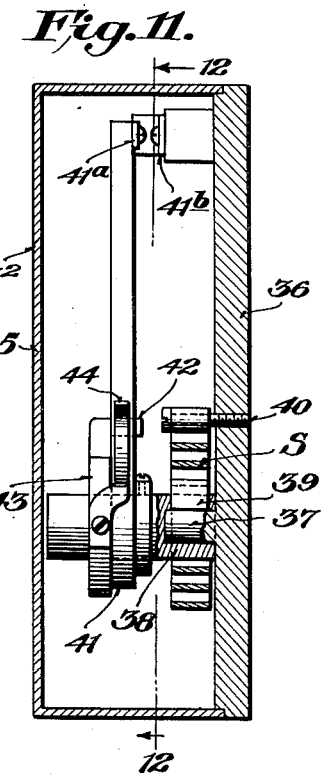

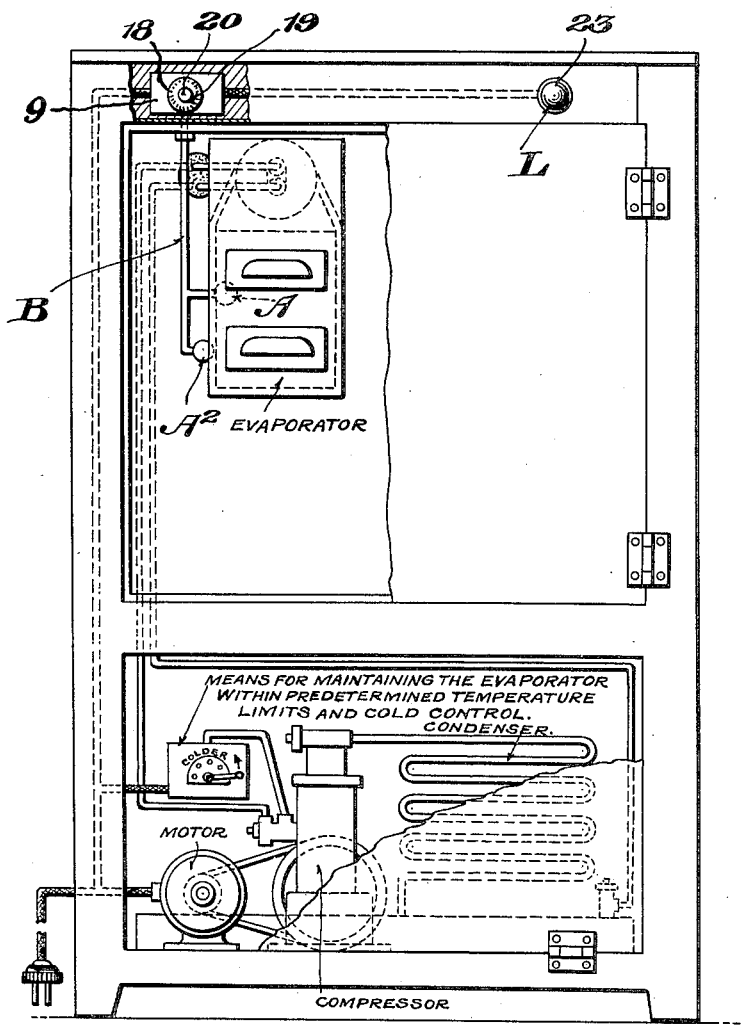

Patented Nov. 8, 1932

1,886,953

UNITED STATES PATENT OFFICE

CHARLES T. HOFFMAN, OF WASHINGTON, DISTRICT OF COLUMBIA, ASSIGNOR OF ONE-HALF TO EMORY L. GROFF, OF WASHINGTON, DISTRICT OF COLUMBIA

MEANS FOR AUTOMATICALLY DEFROSTING REFRIGERATING UNITS

Application filed September 21, 1929. Serial No. 394,209.   REISSUE

This invention relates to refrigeration, and has particular reference to the carrying forward of the fundamental features and principles set forth in my copending application, Serial No. 375,647, filed July 3, 1929, directed to means for automatically defrosting the refrigerating unit at predetermined intervals.

A primary object of the invention is to provide a novel construction and arrangement of parts to adapt the mechanism of my aforesaid application to an icebox of the household type wherein the refrigerating coil is supported in the box and spaced from the walls thereof. In that connection the invention contemplates the provision of means for positioning the ice contacting and following member within the box in close proximity to the ice forming surface while the mechanism actuated and controlled by the circuit controller of said member is concealed in a wall of the box.

Another object of the invention is to provide means for preventing the premature functioning of the defrosting apparatus in ice boxes using a so-called "cold control" which permits the user of the box to materially reduce the temperature in the refrigerating unit for the purpose of freezing liquids other than water, such for example, as ice cream. While the present defrosting means is intended to operate by contact with the ice, nevertheless, since the circuit controller is primarily a thermostat element intended to be actuated at 32° F. or lower by contact with the ice, it might be, under certain conditions, that, if the temperature adjacent the refrigerating unit was caused to go below the temperatures above indicated that the circuit controller would prematurely operate. To avoid this, the present invention also contemplates the utilization of a pilot or control thermostat which is responsive to temperature conditions above the degree of temperature at which the low temperature contact of the main circuit controller is set, but below the normal box temperature where the pilot or control thermostat is located, to assure that the pilot thermostat will open or break the circuit of the low temperature contact of the main circuit controller when demanded while unusual cold conditions exist in the box. Thus, the present invention provides fully for taking care of all conditions of box operation and insures the operation and control of the circuit to the motor by the formation of ice on the refrigerating unit (the ice being the factor that it is desired to eliminate) to secure proper low temperature within the box with a minimum consumption of electrical energy for driving the motor, etc.

A further object of the invention is to provide means whereby 110 volt A. C. may be used to actuate the control arm and switch means when it might not be desired to use a rectified direct current of low voltage.

With the above and other objects in view, the invention consists in the novel features of construction, combination and arrangement of parts as will be hereinafter more fully described, illustrated in the accompanying drawings and defined in the appended claims.

A preferred and practical embodiment of the invention is shown in the accompanying drawings in which:

Figure 3 is an enlarged horizontal sectional view similar to Figure 1, showing the apparatus in position at the conclusion of the defrosting cycle.

Figure 4 is a vertical sectional view taken on the line 4—4 of Figure 3.

Figure 5 is a vertical cross sectional view taken on the line 5—5, Figure 3.

Figure 6 is a detail elevation of the top of an ice box showing the defrosting panel including the manual setting control and the visual indicator.

Figure 7 is a detail diagrammatic view illustrating the circuits involved.

Figure 8 is a detail view illustrating a solenoid for using 110 volt A. C. current which may be substituted for the electromagnets of Figure 7 which preferably use rectified low voltage current.

Figure 9 is a wiring diagram of the two circuit controllers.

Figure 10 is a detail view illustrating a modification of the invention which utilizes a secondary or pilot thermostat switch which operates automatically at temperatures below freezing.

Figure 11 is an enlarged vertical cross sectional view of the cold control thermostat switch.

Figure 12 is a vertical sectional view taken on the line 12—12 of Figure 11.

Figure 13 is a detail view of the collar element for causing positive movement of the cold control thermostat switch arm in one direction and yielding movement in the other direction.

Figure 14 is a diagrammatic view illustrating the application of the invention to a refrigerator.

Similar reference characters designate corresponding parts throughout the several figures of the drawings.

The present defrosting means is intended to be used on automatic refrigerators, such, for example, as the type including a cabinet having a cooling chamber for enclosing or housing the evaporator or refrigerating unit, the said refrigerating unit being suitably connected with means for circulating a refrigerant through the same, together with means for maintaining the evaporator or refrigerating unit within predetermined temperature limits. That is to say, the present invention contemplates the provision of defrosting means operating in conjunction with the instrumentalities referred to but in addition to the usual thermal or pressure control switch means for maintaining the evaporator or cooling unit within predetermined temperature limits which maintains the usual refrigerating cycle. Therefore, it will be apparent that the present construction and arrangement may be readily applied to or embodied in refrigerators having the essential elements pointed out and is intended to automatically control or modify the usual refrigerating cycle to the extent that it will suspend such cycle for a sufficient period to effect defrosting and then automatically restore the cycle to its usual automatic controls.

Figure 1:
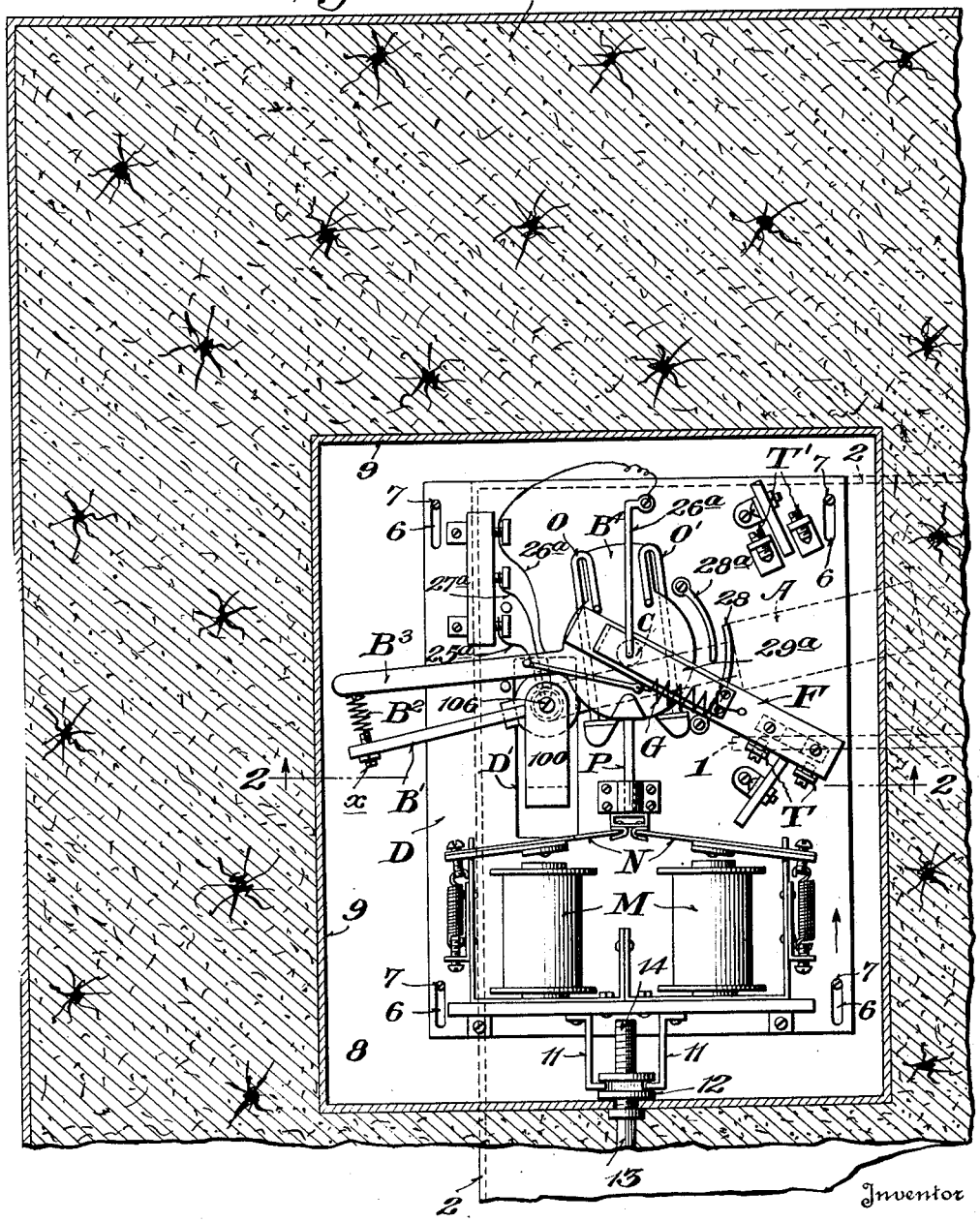
Figure 1 is a sectional view of one corner of a household type of icebox showing the present apparatus installed therein.
Figure 2:
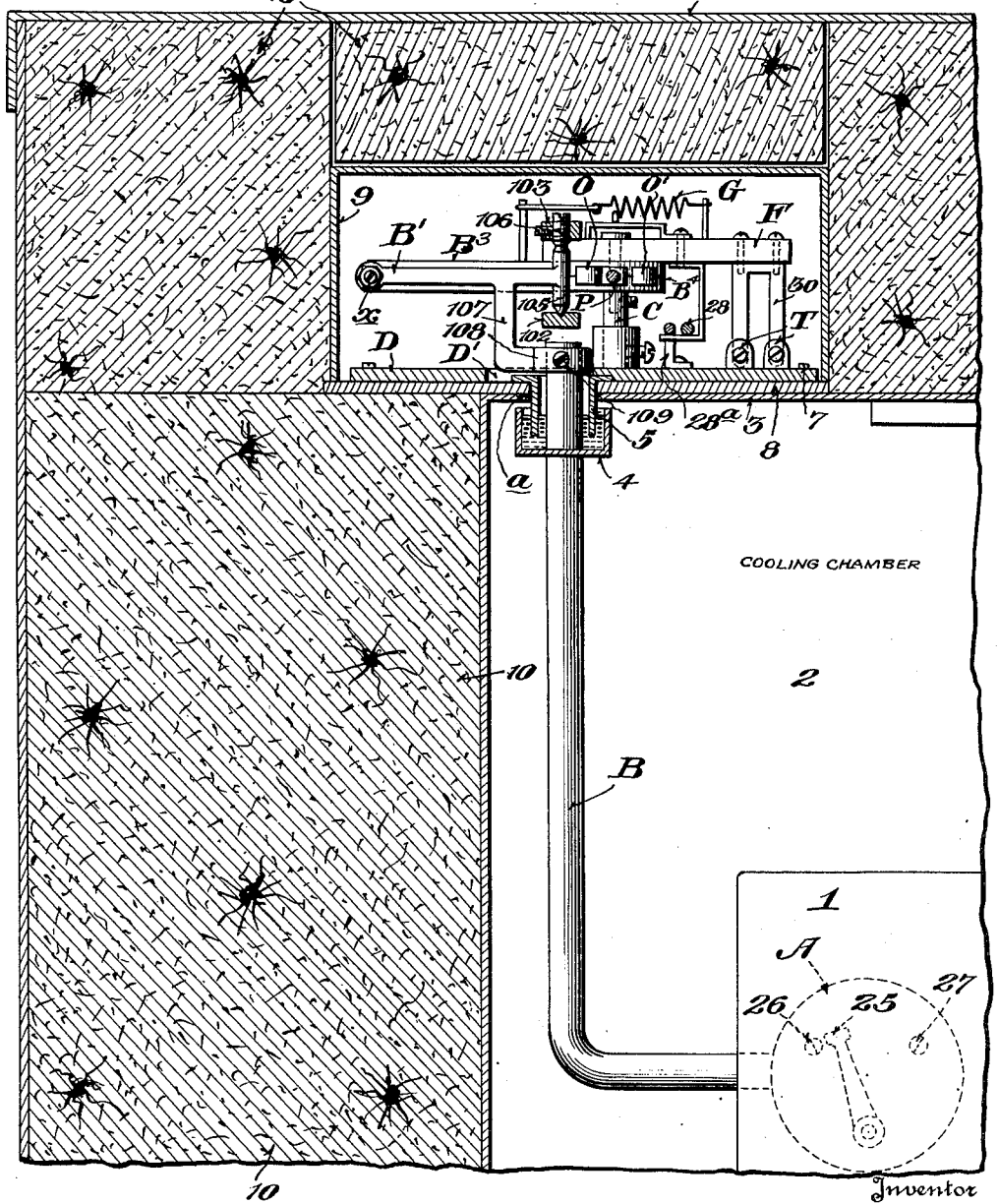
Figure 2 is a vertical cross sectional view taken on the line 2—2, Figure 1.

Referring to the drawings, it will be observed from Figure 1 that the ice contacting and following member A may be arranged in the cooling compartment of the ice box, between a coil or coil baffle 1 of the refrigerating unit and the rear wall 2 of the box so that as the ice builds out on the baffle or coil as the case may be, it will contact with the member A to cause the thermostat switch therein to operate. This member A is carried by the control arm B which projects through an opening $a$ in the top wall 3 (Fig. 2) of the box. This opening may be closed by a liquid seal device which consists of a cup 4 carried by the arm and a ferrule member 5 depending through the opening $a$.

The arm B according to the present arrangement includes the parts B', B2 and B3 the latter being pivoted as at C on the adjustable base D. The part B3 is provided with an enlargement or platform portion B4 on which are suitably mounted the sliding dogs O and O'. On the pivot C is also mounted the switch arm F, and the said switch arm and the element B3 of the control arm are connected by the spring G. The dogs O and O' are adapted to be alternately engaged by the sliding plunger P connected with the spring armature element N of an electromagnet device M. When the circuit is closed to the magnets M the plunger P will be moved to engage the dogs O and O' and cause the relative position on the arms B3 and F to change, that is change from the position shown in Figure 1 to the position shown in Figure 3 except as determined by the tension of spring B2, the purpose of which, primarily, is to render effective its action regardless of the position of the manual control.

In the position of parts shown in Figure 1 the apparatus is set so that when the ice formation builds up on the coil or coil baffle and touches the member A, the thermostat switch therein will temporarily close the circuit to the magnet M and cause the head of the plunger P to actuate the dog O and cause it to engage the switch lever or arm F at one side of its center and move it against the tension of the spring G which will cause the arm F to move away from the terminals T which are connected to the motor of the refrigerating apparatus and toward the terminals T' which are connected to the defrosting indicator circuit which includes the defrosting indicator lamp L.

The position of parts during the defrosting period is clearly shown in Figure 3. In this figure the switch arm F is shown as against the terminals T' of the defrosting circuit while the circuit which controls the motor of the refrigerating apparatus is broken due to the fact that the switch arm has moved away. The switch arm F remains in the position shown in Figure 3 until the ice is completely melted from the entire ice forming unit and the temperature of the box has risen sufficiently to operate the thermostat switch of the member A to again close the circuit to the magnets M and cause the plunger P to engage the dog O' and throw the arm F back to the position of Figure 1.

While the apparatus is in the position shown in Figure 3, that is, during the defrosting period it will be observed that the arm B and its supporting bracket portion B' are under the tension of the spring B2 connected with the arm B3. It will thus be apparent that the tension of the spring B2 may be less than the tension of the spring G which connects the arms B3 and F. This difference in tension is only required to be sufficient to permit the complete action of the arm B3 under any setting of the manual control. That is to say, under the minimum refrigerating cycle setting, the ice contacting and following member will have a maximum movement, for instance, less than one-half of the required movement of member B3 to permit the dog O' to engage the head of the plunger P. This difference in action is compensated for fully by the tension of spring B2. The combined tension of the springs G and B2 will cause the member A to positively contact with and follow the melting ice until it rests on the coil or coil baffle where it remains until the end of the defrosting period.

In connection with the spring B2, it will be observed that the tension of the same is adjustable through the medium of the adjusting screw $x$.

The foregoing description describes generally the operation of the device and reference will now be made to the details of the specific parts of the apparatus.

As previously indicated the apparatus briefly described is mounted on the adjustable base D which base is provided with the slots 6 adapted to engage with the guide pins 7 carried by a permanent base 8 suitably anchored to a convenient part of the box and which may receive a cover 9 for removably covering and concealing or housing the entire apparatus to meet underwriter's requirements. The unit thus made, may be conveniently placed in a wall of the ice box above the cooling chamber so that the arm B projects through the hole $a$ in a wall of the box. The entire assembly may be surrounded by insulation 10 of the type usually used in ice boxes of this character and may be readily accessible and removable through the cover 11 on the top of the box.

The adjustable base D mounted on the permanent base 8 is preferably provided with bracket members 11 for receiving a grooved nut 12 which is held between the members in such a way that a manually operated rod 13 having the screw threads 14 may be utilized to shift the base or platform D in the direction of the arrow shown in Figure 3. The platform or base D is shown as being set in position for the maximum refrigerating cycle, that is in position to permit of, for example, a fifteen day refrigerating cycle so that if it is desired to defrost in a less number of days, it is only necessary for the user of the box to manipulate the rod 13 to move the base D in the direction of the arrow. This can be readily done because the base D is provided with a slot D' which clears the bracket 100 mounted on the stationary base 8 and which serves to pivotally support the arm B and its associated parts.

Referring further to the manually operated rod 13, it will be observed from Figure 3 that the same is adapted to extend through the upper front wall of the box. One way of mounting the rod 13 so that it will turn but not move longitudinally is to provide the same with a collar 16 which will operate in a socket 17. Surrounding the rod 13 is a dial 18 having thereon suitable indications, for example, the numerals "1" to "15" inclusive which may indicate the number of days of the refrigerating cycle. This indicia is adapted to be read in connection with a hand or pointer 19 carried by the operating knob 20 which is keyed or otherwise suitably made fast to the end of the rod 13. This knob 20 and dial 18 are located on the upper or so-called defrosting panel of the box as shown in Figure 6.

The defrosting panel is designated generally as 21 and is preferably arranged above the door 22 so that the user of the box may always conveniently and readily be able to determine from the dial 18 when the defrosting period will take place, or on the other hand, can adjust the refrigerating cycle in such a way as to make the defrosting period occur at certain specified intervals.

In addition to the manual control and dial being located on the defrosting panel the latter also includes a window 23 behind which the defrosting lamp L of the defrosting circuit is located. This window may be provided with suitably colored glass or may be provided with any suitable indicia such, for example, as the word "Defrosting" to announce at all times to the user that the box is defrosting and that the refrigerating cycle has temporarily ceased.

Referring more particularly to the ice contacting and following member A, it will be observed that the same comprises a metallic casing which houses a thermostat switch adapted to close an electric circuit temporarily at a predetermined low temperature point and a predetermined high temperature point. In the example shown the thermostat switch includes a thermostat element 24 of any suitable type which is anchored at one end of the casing while its other end engages with a circuit closing arm 25 which may be suitably insulated from the casing and connected with a source of electrical energy through the wire 25a which wire in the diagram also includes the electromagnets M or a solenoid 50 in its circuit.

When the ice builds out on the ice forming surface and makes contact with the metallic casing of the member A thereby to conduct freezing temperature to the thermostat element the circuit closing arm 25 will engage with the low temperature contact 26. When the arm 25 engages with the contact 26, the circuit is closed from the source of electrical energy through the electromagnets M, arm 25 and contact 26 to the wire 26a which connects with the arcuate contact 28 which in turn is in contact with the sliding switch arm 29 which is in electrical contact with the plate 29a to which the remainder of wire 26a is connected. This closing of the circuit causes the electromagnets M to operate the plunger element N, thereby to engage the dog O and pull it toward the magnets for the purpose of forcing the switch arm F from the position shown in Figures 1 and 7 to the position shown in Figure 3, thereby placing the ice contacting and following member A under tension and causing it to follow the ice formation until all of the ice has melted from the ice forming surfaces and the temperature rises to cause the thermostat element 24 to move the arm 25 back into engagement with the high temperature contact 27.

When the high temperature contact 27 is engaged by the arm 25 the circuit will again be closed through the electro-magnets and will go back to the source of energy over the wire 27a which connects with the arcuate member 28a and which arcuate member is engaged by the spring contact member 29 carried by the underside of the arm F and which is connected as above shown to wire 26a. When the circuit is closed through the high temperature contact 27 the electromagnets will actuate the armature N to pull the dog O' forward and cause the parts to move from the position shown in Figure 3 back to the position shown in Figures 1 and 7.

When the switch arm F is in the position shown in Figures 1 and 7 the switch contacts 30 carried by the arm F are in engagement with the motor circuit contacts T of Figure 1 and 31 of Figure 7, thereby maintaining the refrigerating cycle in the usual manner. However, on the other hand, when the switch arm is in the position shown in Figure 3 the contacts 30 break the circuit to the motor and prevent the restoration of the refrigerating cycle until all of the ice is melted from the ice forming unit or evaporator. While the circuit is broken to the motor of the refrigerating apparatus, the contacts 30 are in engagement with the contacts T' of Figure 1, which are the same as the contacts 31' of Figure 7 of the indicating circuit 32, which includes the lamp L or equivalent indicator.

Another important and distinctive feature of the present invention resides in the provision of means for preventing premature closing of the circuit between the arm 25 of the member A and the low temperature contact 26. When the present device is used in connection with an ice box having a so-called cold control feature or its equivalent, it has been found that the same will operate when the ice contacts with the metallic casing thereof and the low temperature contact 26 is set at ice temperature in relation to the ice forming unit. In other words, as the ice builds out to the circuit controller, it has been observed that the arm 25 will hang around a temperature safely above the setting of the low temperature contact due to the fact that the relatively warm air in the box is continuously circulating between the ice and the member A and around member A. However, when the ice builds out to and contacts with the circuit controller, the latter will immediately respond to ice temperature and the contacts 25 and 26 will close the circuit previously described. In refrigerators using the so-called cold control feature which if improperly attended permits the temperature to go below freezing, there is a possibility that the switch of the member A would prematurely operate due to the fact that the low temperature adjacent the unit would cause the arm 25 to engage with the contact 26 before the ice formation builds out to the member A. To avoid such a contingency a cold control thermostat device A2 may be employed. This device may be positioned anywhere adjacent the refrigerating unit, but for the sake of convenience may be carried by the lower end of the arm B which carries the member A, as shown in Figure 10. This thermostat device A2 is shown in detail in Figures 11, 12 and 13 and includes the casing 35 having a cover 36 on which is mounted a stud 37 carrying therewith an insulated post 38 which is free to turn on the stud 37. One end of the post 38 is engaged with the free end 39 of a thermostat element S whose other end is anchored as at 40 to the cover 36. Loosely and freely mounted on the insulated post 38 is a circuit closing arm 41. This arm is adapted to be engaged by the offset portion 42 of a collar 43 keyed or pinned to the member 38 so that as the temperature lowers in the box to a predetermined point above the degree at which the contact 26 is set, the thermostat element S will cause the post 38 to rotate and carry with it the collar 43 whereby the offset portion 42 will move the arm 41 so that its upper end, which carries the contact 41a will be moved away from the contact 41b. This contact 41b is connected with the wire 26a and likewise the metallic circuit closing arm 41 is connected with the wire 26a. Thus, when excessive low temperature prevails, the circuit including the low temperature contact 26 is automatically opened or broken by this so-called cold control thermostat. When the temperature in the box is normal the thermostat element S will maintain the contacts 41a and 41b in engagement so that the arm 25 in engaging the contact 26 will always be ready to close the circuit when the ice builds out and touches the member A. When the temperature is sufficiently above the point at which contact 26 is set, a spring 44 on the collar 43 engages and presses the arm 41 in a direction to maintain its contact 41a against the contact 41b. It will, of course, be understood that when temperature at some predetermined point higher or lower than the point at which contact 26 is set prevails the offset portion 42 moves away from engagement with the arm 41 and the spring 44 exerts its force. The movement of the thermostat element S may be so extended upon a stoppage of line current and consequent excessive rise in temperature in the box as to possibly injure the thermostat element because of its low temperature setting. The spring 44 will adequately provide for that. By way of illustrating the functioning of the pilot or cold control thermostat, the following example is given:—If the low temperature contact 26 of circuit controller A is set at 31° F. with a minimum normal box temperature of 34° F. at the position of the pilot thermostat, the latter may be set at 32½° F. which will prevent any low temperature dip in the box from actuating the defrosting device, and will assure the proper functioning thereof when circuit controller A contacts with the ice formation on the coils or baffles upon resumption of normal box temperature. This permits the use by the owner of the box of the cold control during the refrigerating cycle without any possibility that the defrosting cycle will start while the temperature of the box is thus lowered below normal. The device accordingly provides for starting the defrosting cycle at the proper time; will effect a complete removal of the ice formed on the coils and baffles, and will restore the refrigerating cycle following the elimination of the ice, with the minimum interval of time prevailing between such ice elimination and the resumption of the refrigerating cycle. Thus, the factor of owner's neglect or oversight will not serve to permit any undue formation of ice on the cooling unit or permit the compressor to remain idle unduly long with a resulting abnormal rise in box temperature and consequent food spoilage.

While it has been proposed to use a rectified direct current of low voltage in connection with the actuating means for the armature N, it is also possible that in some installations this reduced low voltage current will be unnecessary. In that event a solenoid of the type shown in Figure 9 may be used. This solenoid may be placed in the circuit including the wires 25a and connected with a source of 110 volt alternating current. The solenoid is designated generally as 50 and includes the core portion 51 and the frame part 52. This frame is preferably directly connected with the plunger P' which is adapted to alternately engage the heads of the dogs O and O'. When alternating current is applied to the solenoid for an instant by the closing of the circuit through either of the contacts 26 and 27, the core 51 will be drawn to the center of the coil and when the current is cut off the core will be forced back to its outward position by the spring P2 ready for the next energization.

Referring again to the member B which projects into the cooling compartment of the ice box, it is pointed out that the same has a free pivotal mounting in the bracket 100 (see Fig. 4). This bracket is carried by the permanent or stationary base 8 and is secured thereto as indicated at 101. The said bracket has an intermediate arm 102 and an upper arm 103, the former having a seat 104 for receiving the lower end of a bearing pin 105 whose upper end is adapted to be engaged by an adjusting screw 106. The bearing 105 is a part of the member B' which has an angular pendant arm 107 which is provided with a collar 108 for receiving the tubular member B. While any suitable and convenient means may be utilized for holding the tubular member B in the collar 108, a set screw 109 is preferable since it permits of accurate adjustment of the arm B. This type of bearing or support for the arm B which carries the ice contacting and following member A is of particular importance since it provides a substantially frictionless mounting for the arm B and enables the member A to freely and fully follow the ice formation and also requires a minimum amount of energy from the actuating parts to cause it to follow the ice and reset it to its initial position.

It will be readily appreciated that the members A and F are motor control switches, since they function to control the opening and closing of the circuit to the motor which is a part of the means for circulating the refrigerant medium through the evaporator. The motor control switch A is located at the evaporator and motor control switch F is mounted on the refrigerator housing, and, through the medium of the means of the elements 12, 13, and 20, can be manually adjusted to vary their effective operation and in turn vary the temperature at the evaporator. Thus control of the refrigerator motor is conveniently provided for by the location on the refrigerator housing of a manually adjustable unit control knob and calibrated indicating means to establish selected temperature settings of the temperature control means of the refrigerating apparatus.

In connection with the liquid seal device arranged at the opening A it is pointed out that the same is preferably filled with glycerine because of its non-volatile and hygroscopic properties. That is to say, glycerine will not be substantially affected by temperature conditions of the box and at the same time will last indefinitely because it will not evaporate, has no odor and at the same time tends to absorb moisture.

I claim:

1. In an apparatus for automatically defrosting refrigerating units the combination with a switch, for automatically opening and closing the circuit to the refrigerator motor, an ice following and contacting member, a thermostatically operated circuit closer carried by said ice contacting and following member and having low and high temperature contacts, and a thermostat operating at a temperature above or below the set temperature of said low contact and included in an electrical circuit with said low temperature contact, whereby at unusual low temperatures the circuit to the low temperature contact will be automatically opened.

2. In an apparatus for automatically defrosting refrigerating units, an ice contacting and following member, high and low temperature contacts carried by said member, a thermostatically controlled arm adapted to engage with said high and low temperature contacts, circuits for said high and low temperature contacts and said arm, and a thermostatic circuit closer included in the circuit of the low temperature contact.

3. In an apparatus for automatically defrosting refrigerating units, an ice contacting and following member, high and low temperature contacts carried by said member, a thermostatically controlled arm adapted to engage with said high and low temperature contacts, circuits for said high and low temperature contacts and said arm, and a thermostatic circuit closer included in the circuit of the low temperature contact to open said circuit at temperatures above or below the setting of the said low temperature contact.

4. In an electrical refrigerator, the combination with outer and inner walls enclosing the cooling chamber, an ice forming unit within the cooling chamber, means for circulating a refrigerant in the unit and means for maintaining the unit within predetermined temperature limits, of a defrosting device including a controlling member projecting through the inner wall of the refrigerator and in proximity to said ice forming unit.

5. In an electrical refrigerator, the combination with outer and inner walls enclosing the cooling chamber and the ice forming unit supported in said chamber, means for circulating a refrigerant in the unit and means for maintaining the unit within predetermined temperature limits, of a switch mechanism arranged between said outer and inner walls, a member projecting through the said inner wall and operatively connected to said switch mechanism, and means carried by said member for controlling the operation of the switch.

6. In an electrical refrigerator, the combination with the outer and inner walls enclosing the cooling chamber and the ice forming unit therein, said inner wall having an opening, means for circulating a refrigerant in the unit and means for maintaining the unit within predetermined temperature limits, of a switch mechanism arranged between the outer and inner walls, a member projecting through said opening and operatively connected to said switch mechanism, sealing means for closing the opening, and means carried by said member for controlling the operation of the switch.

7. In an electrical refrigerator, the combination with outer and inner walls for enclosing the cooling chamber, said inner wall having an opening, an ice forming unit supported in said chamber, means for circulating a refrigerant in the unit, and means for maintaining the unit within predetermined temperature limits, of a switch mechanism arranged between the outer and inner walls, a member projecting through said opening and operatively connected with said switch mechanism, a liquid seal device for closing the opening, and means carried by said member for controlling the operation of the switch.

8. In an electrical refrigerator, the combination with outer and inner walls enclosing the cooling chamber, said inner wall having an opening, an ice forming unit supported in the cooling chamber, means for circulating a refrigerant in the unit and means for maintaining the unit within predetermined temperature limits, of a defrosting device arranged between the outer and inner walls and including a movable member projecting through said opening into the cooling chamber, a thermostatic switch device carried by the movable member and disposed in spaced relation to the refrigerating unit, and means for manually varying the spaced relation of the thermostatic device to the refrigerating unit.

9. In an electrical refrigerator, the combination with outer and inner walls enclosing the cooling chamber, said inner wall having an opening, an ice forming unit for cooling said chamber, means for circulating a refrigerant in the unit and means for maintaining the unit within predetermined temperature limits, of a defrosting device arranged between said outer and inner walls and including a movable member projecting through said opening into the cooling compartment, a thermostatic switch device carried by the movable member and disposed in spaced relation to the refrigerating unit, and means for controlling the operation of said member, said means including a rod projecting through the outer and inner walls of the box and having a knob on the end thereof exposed on the outside of the box for manual manipulation to change the relative spacing of the thermostatic switch device with reference to the refrigerating unit.

10. In an electrical refrigerator, the combination with outer and inner walls enclosing the cooling chamber, said inner wall having an opening, an ice forming unit for cooling said chamber, means for circulating a refrigerant in the unit and means for maintaining the unit within predetermined temperature limits, of a defrosting device arranged between said outer and inner walls including a switch, switch throwing means, levers operated simultaneously with said switch throwing means and certain of said levers extending through said opening into the cooling chamber, and a thermostatic circuit closer in circuit with said switch throwing means and carried by the lever projecting into the cooling chamber.

11. In an electrical refrigerator, the combination with outer and inner walls enclosing the cooling chamber, said inner wall having an opening, an ice forming unit for cooling said chamber, means for circulating a refrigerant in the unit and means for maintaining the unit within predetermined temperature limits, of a defrosting device arranged between said outer and inner walls and including a switch for automatically opening and closing the circuit to the means for maintaining the ice forming unit within predetermined temperature limits, a control arm projecting through said opening into the cooling chamber, an ice contacting and following member carried by said arm, electrically operated actuating means for said switch and control arm, a circuit closer carried by said ice contacting and following member and electrically connected with said actuating means, and means exposed at the outside of the refrigerator for manually setting the ice contacting and following member in spaced relation to the ice forming unit.

12. In an electrical refrigerator, the combination with outer and inner walls enclosing a cooling chamber, one of said inner walls having an opening, an evaporator for the cooling chamber, means for circulating a refrigerant through the evaporator and means for maintaining the evaporator within predetermined temperature limits, of a defrosting device arranged between an outer and inner wall including a switch in circuit with the means for maintaining the evaporator within predetermined temperature limits, a control arm projecting through said opening in one of said inner walls, an ice contacting and following member carried by said arm, electrically operated actuating means for said control arm, a circuit closer carried by said ice contacting and following member and electrically connected with said actuating means, and means extending through another outer and inner wall and having a knob arranged in an exposed position on said latter outer wall for manual manipulation, and an indicating dial on said last mentioned outer wall cooperating with said knob for selectively setting the ice contacting and following member in spaced relation to the evaporator.

13. In an electrical refrigerator, the combination with outer and inner walls respectively enclosing the cooling chamber and means for maintaining a refrigerating cycle including an evaporator, means for circulating a refrigerant therein and means for maintaining the evaporator within predetermined temperature limits, of a defrosting device arranged between said outer and inner walls and including a reciprocating switch arm, motor circuit contacts and indicating circuit contacts arranged at the respective limits of movement of the reciprocating switch arm, a control arm projecting into the cooling chamber through one of said inner walls, an ice contacting and following member carried by said arm, electrically operated actuating means for said switch and control arm, a circuit closer carried by said ice contacting and following member and electrically connected with said actuating means, means extending through one of said outer walls for manually setting the ice contacting and following member, means cooperating with said last named means for timing the refrigerating cycle, and means also arranged on one of said outer walls of the refrigerator and electrically connected with said indicating circuit contacts for indicating the performance or non-performance of the refrigerating cycle.

14. In an electrical refrigerator, the combination with outer and inner walls enclosing the cooling chamber and means for maintaining a refrigerating cycle including an evaporator, means for circulating refrigerant therein and means for maintaining the evaporator within predetermined temperature limits, of a defrosting device arranged between certain of said outer and inner walls and including a switch connected with said means for maintaining the evaporator within predetermined temperature limits, a control arm projecting through an inner wall into the cooling chamber, a bracket supported at the inner side of said inner wall, a bearing mounted in said bracket, a member pivoted coaxially with said switch and operatively connected with said bearing, electrically operated actuating means for said switch and said member, an ice contacting and following member carried by said control arm, and a circuit closer carried by said ice contacting and following member and electrically connected with said actuating means.

15. In an electrical refrigerator, the combination of a housing having a cooling compartment, a door for said cooling compartment; refrigerating apparatus concealed within the housing and including an evaporator, means for circulating a refrigerant therein, means for maintaining the evaporator within predetermined temperature limits;

means controlled by the formation and melting of ice on the evaporator for modifying the operation of said means for circulating refrigerant in the evaporator to effect defrosting, and means on an outer wall of the housing for indicating the initiation, duration, and termination of the period of defrosting.

16. In an electrical refrigerator, the combination of a housing having a cooling compartment, a door for said cooling compartment; refrigerating apparatus concealed within the housing and including an evaporator, means for circulating a refrigerant therein, means for maintaining the evaporator within predetermined temperature limits; means controlled by the formation and melting of ice on the evaporator for modifying the operation of said means for circulating refrigerant in the evaporator to effect defrosting; means on an outer wall of the housing adapted to be selectively positioned to set the said means controlled by the formation and melting of ice to determine the period in which defrosting will not be effected; means also on an outer wall of the housing for indicating the initiation, duration, and termination of the period of defrosting.

17. In an electrical refrigerator, the combination of a housing having a cooling compartment, a door for said cooling compartment; refrigerating apparatus within the housing and including an evaporator, means for circulating a refrigerant therein, means for maintaining the evaporator within predetermined temperature limits; a thermally controlled defrosting device for modifying the operation of said means for circulating refrigerant in the evaporator to defrost the evaporator; and a device adapted to be selectively positioned to set the said defrosting device to determine the period in which defrosting will not be effected.

18. In an electrical refrigerator, the combination of a housing having a cooling compartment, a door for said cooling compartment; refrigerating apparatus within the housing and including an evaporator, means for circulating a refrigerant therein, means for maintaining the evaporator within predetermined temperature limits; a thermally controlled defrosting device for modifying the operation of said means for circulating refrigerant in the evaporator for a period to defrost the evaporator; and means on an outer wall of the housing operatively connected with said defrosting device for indicating the initiation, duration, and termination of the defrosting period.

19. In an electrical refrigerator, the combination with the evaporator, means for circulating a refrigerant in the evaporator, and means for maintaining the evaporator within predetermined temperature limits, of a thermally controlled defrosting device adapted to be actuated at predetermined limits of temperature to modify the operation of said means for circulating refrigerant in the evaporator to defrost the evaporator, and means to prevent effective operation of the defrosting device at a predetermined temperature condition of said device.

20. In an electrical refrigerator, the combination with the evaporator, means for circulating a refrigerant through the evaporator, means for maintaining the evaporator within predetermined temperature limits, means for modifying the operation of said last named means to provide for selectively maintaining a lower temperature at the evaporator, and a defrosting device to defrost the evaporator, of means to prevent the effective operation of said defrosting device upon actuation of said means for selectively maintaining a lower temperature at the evaporator.

21. In an electrical refrigerator, the combination with the evaporator; means for circulating a refrigerant in the evaporator, means for maintaining the evaporator within predetermined temperature limits, means for modifying the operation of said last named means to obtain increased cold conditions at the evaporator; of means for automatically defrosting the evaporator, including a device for rendering inoperative said means for automatically defrosting the evaporator while the means for modifying the operation of said second named means is in operation.

22. In an electrical refrigerator, the combination with the evaporator, means for circulating a refrigerant through the evaporator, means for maintaining the evaporator within predetermined temperature limits, and means for modifying the operation of said last named means to provide for selectively maintaining a lower temperature at the evaporator; of a defrosting device to defrost the evaporator, said device being controlled by the formation and melting of ice on the evaporator.

23. In an electrical refrigerator, the combination with the evaporator and motor concealed within the refrigerator housing, means for circulating a refrigerant in the evaporator, means for maintaining the evaporator within predetermined variable temperature limits, and a current supply line for furnishing current to said two last named means; of a member for opening the circuit in said current supply line for a period to defrost the evaporator and for closing the circuit at the end of said period, automatic means for actuating said member to initiate and terminate the defrosting period, and means on an outer wall of said housing for indicating the initiation, duration, and termination of the defrosting period.

24. In an electrical refrigerator including a housing having an exterior panel, the combination with the evaporator, means for circulating a refrigerant in the evaporator, means for maintaining the evaporator within predetermined variable temperature limits, and a current supply line for furnishing current to said two last named means, of a member including means for automatically opening the circuit in said current supply line for a period to defrost the evaporator and for closing the circuit at the end of said period, means located on said panel for selectively positioning said member to determine the period in which defrosting will not be effected, and means operatively connected with said member for indicating the initiation, duration, and termination of the defrosting period.

25. In combination, a refrigerator cabinet having an interior cooling chamber and an exterior panel, an evaporator in the cooling chamber, means for circulating a refrigerant through the evaporator, means for maintaining the evaporator within predetermined temperature limits, means for defrosting the evaporator, means arranged on said panel adapted to be positioned to selectively choose the period of the refrigerating cycle and prevent the operation of said means for defrosting until predetermined frost conditions occur on the evaporator, and means also on said panel for indicating the initiation, duration, and termination of the defrosting period.

26. In combination, a refrigerator cabinet having an interior cooling chamber and an exterior panel, an evaporator in the cooling chamber, means for circulating a refrigerant through the evaporator, means for maintaining the evaporator within predetermined temperature limits, means for defrosting the evaporator, and means arranged on said panel adapted to be positioned to selectively choose the period of the refrigerating cycle and prevent the operation of said means for defrosting until predetermined frost conditions occur on the evaporator.

27. In an electrical refrigerator, the combination of a housing having a cooling compartment, refrigerating apparatus within the housing and including an evaporator in the cooling compartment, means for circulating a refrigerant medium through the evaporator including a motor, switch mechanism for controlling the motor located within the walls of the housing and including a thermal cutout in operative proximity to the evaporator, an adjustment control for the switch mechanism, a unit control including a knob rotatable to operate the adjustment control and extending outside the housing; and means actuated by the knob at opposite positions of its movement, to render the thermal cutout effective and ineffective respectively.

28. In an electrical refrigerator, the combination of a housing having a cooling compartment, refrigerating apparatus within the housing and including an evaporator in the cooling compartment, means for circulating a refrigerant medium through the evaporator including a motor, a plurality of motor control switches, an adjustment control for one of said switches, and a unit control comprising means for actuating the adjustment control to change its effective position, said means including a rotatable part located on the housing and being operatively associated with the last mentioned switch.

29. In an electrical refrigerator, the combination of a housing having a cooling compartment, refrigerating apparatus within the housing and including an evaporator in the cooling compartment, means for circulating a refrigerant medium through the evaporator including a motor, temperature responsive motor control structure having a thermal cutout device and an adjustment control device, a unit control comprising means for actuating the adjustment control, said means including a rotatable knob located on said housing and being operatively associated with said thermal cutout device to provide a plurality of predetermined temperature settings of said thermal cutout.

In testimony whereof I affix my signature.
CHARLES T. HOFFMAN.